Figure 3:
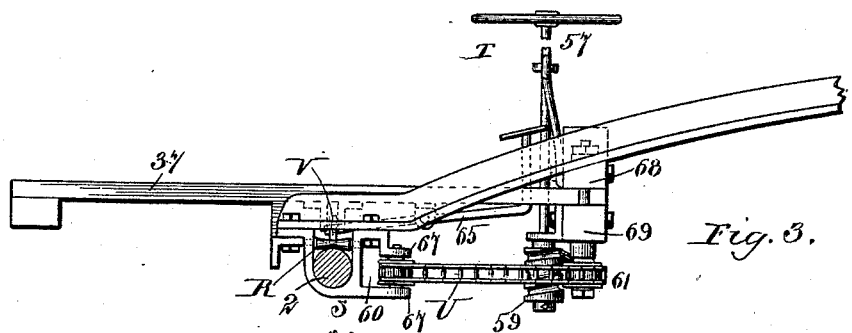

(No Model.) 9 Sheets—Sheet 1.
M. G. BUNNELL.
MACHINE FOR MAKING AND REPAIRING ROADS.
No. 427,740. Patented May 13, 1890.
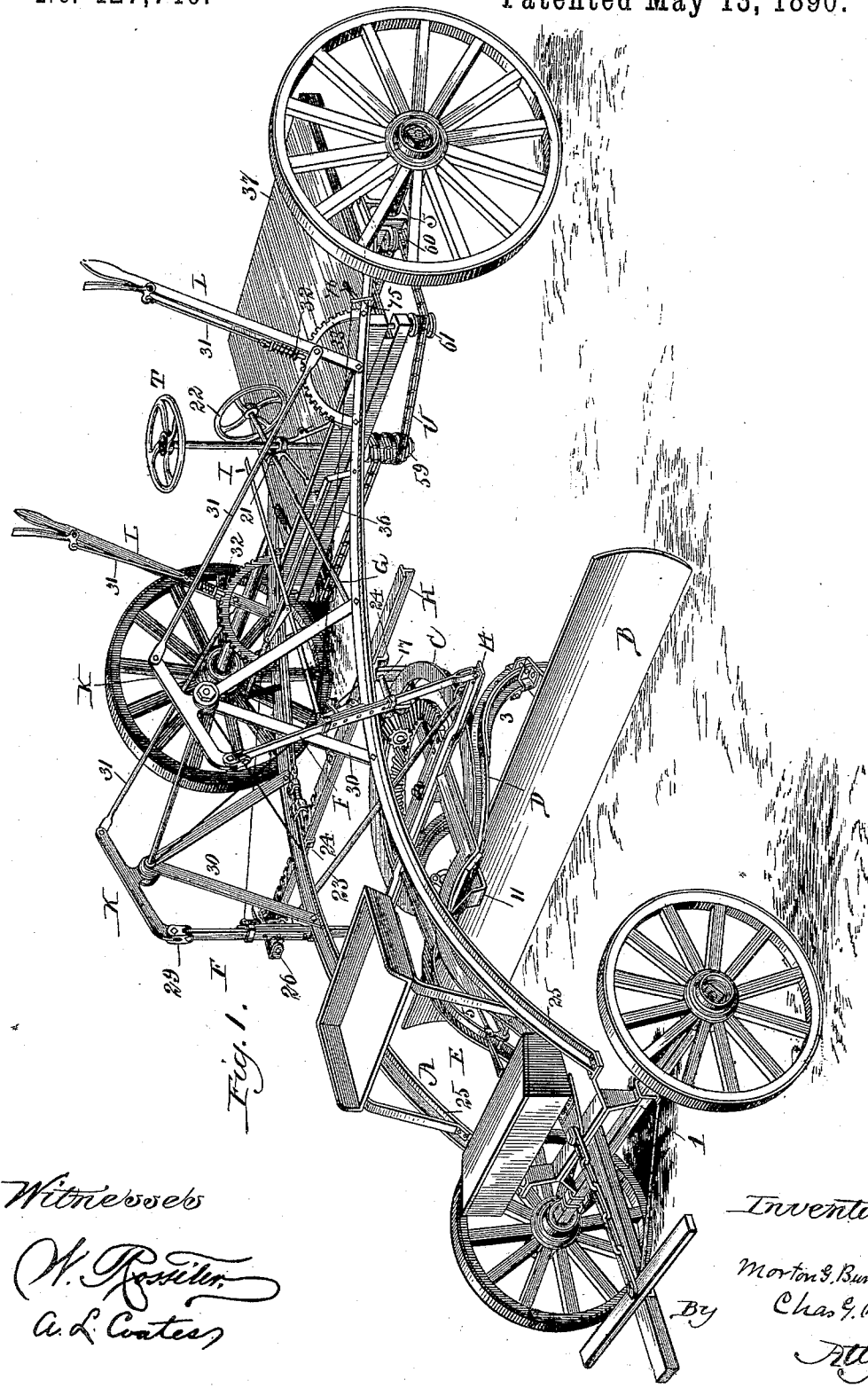
Witnesses
W. Rossiter
A. L. Coates
Inventor
Morton G. Bunnell
By Chas. G. Page
Atty.

(No Model.) 9 Sheets—Sheet 2.

M. G. BUNNELL.
MACHINE FOR MAKING AND REPAIRING ROADS.

No. 427,740. Patented May 13, 1890.

Witnesses
W. Rossiter
A. L. Coates

Inventor
Morton G. Bunnell
By Chas. G. Page
Atty.

(No Model.) 9 Sheets—Sheet 3.
M. G. BUNNELL.
MACHINE FOR MAKING AND REPAIRING ROADS.
No. 427,740. Patented May 13, 1890.
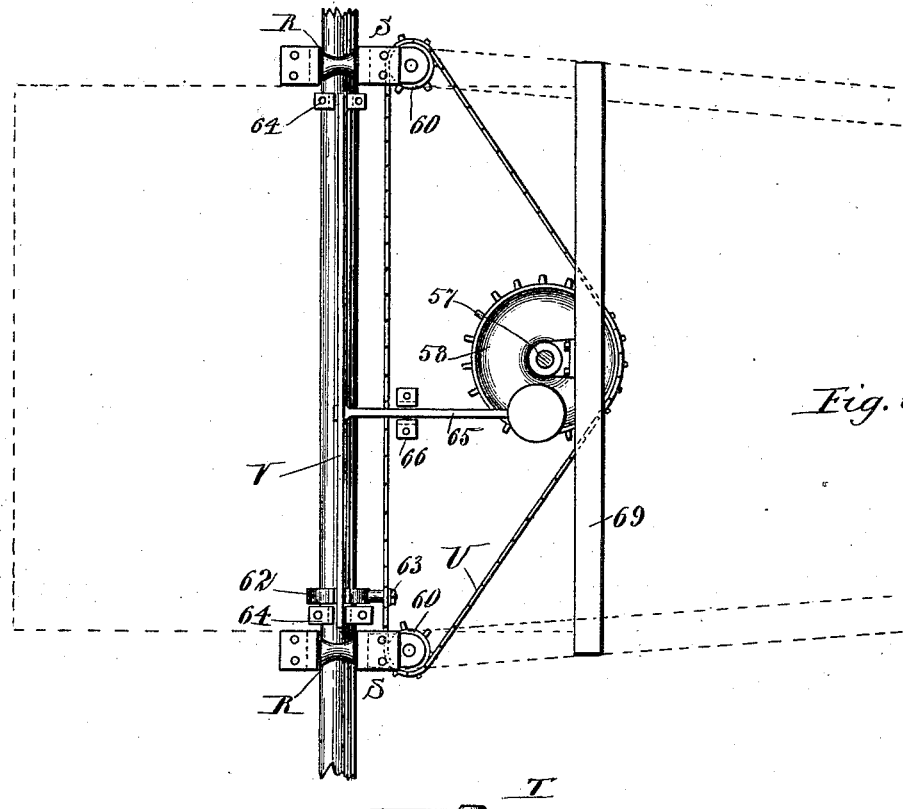
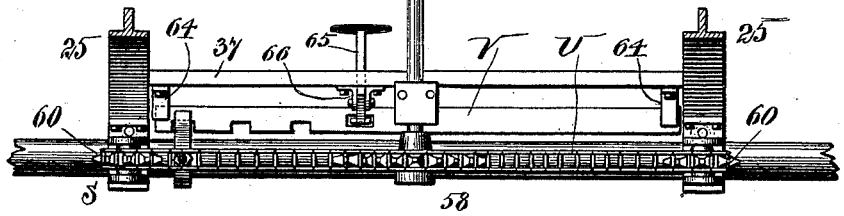
Witnesses
W. Rossiter
A. L. Coates
Inventor
Morton G. Bunnell
By Chas. G. Page
Atty.

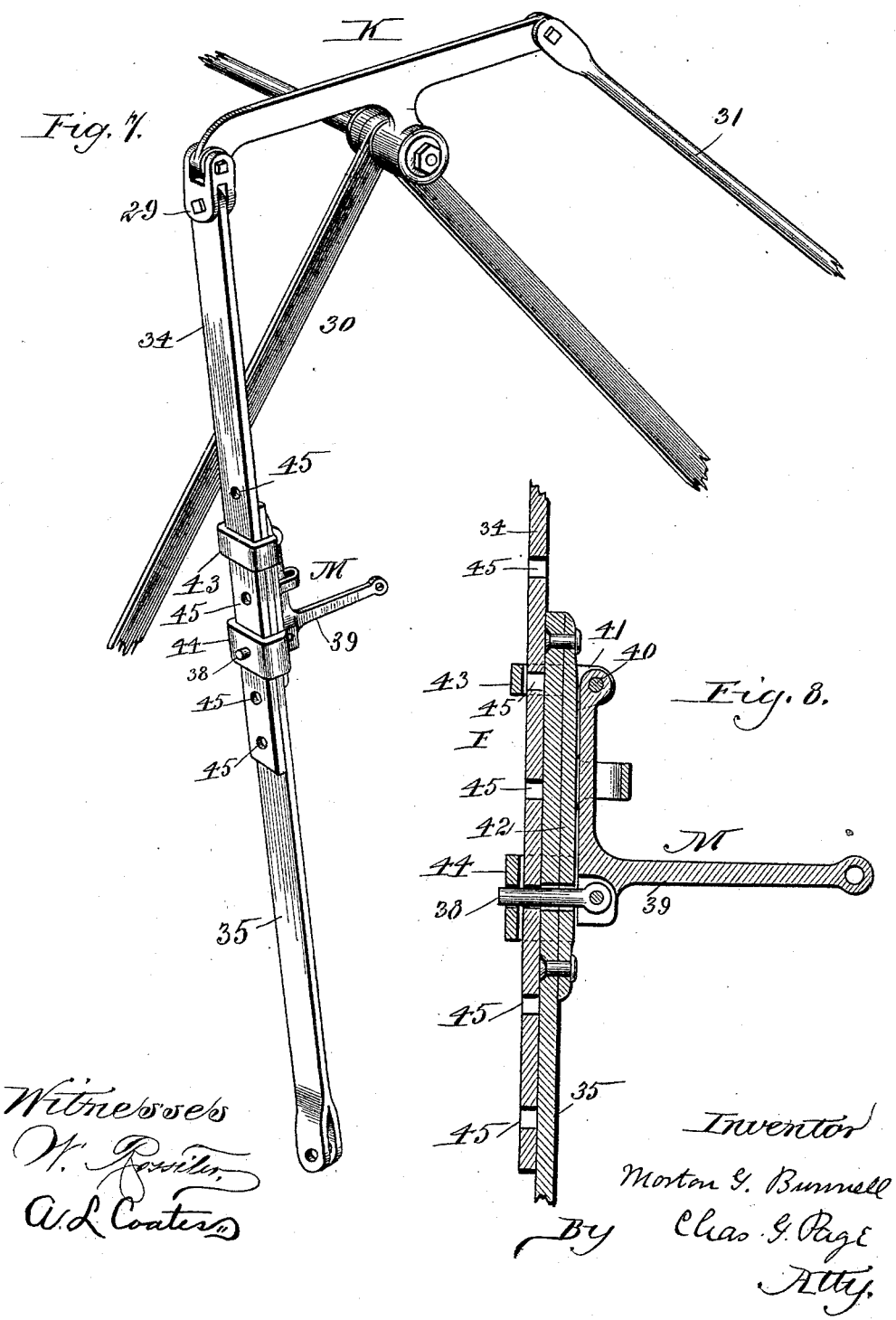

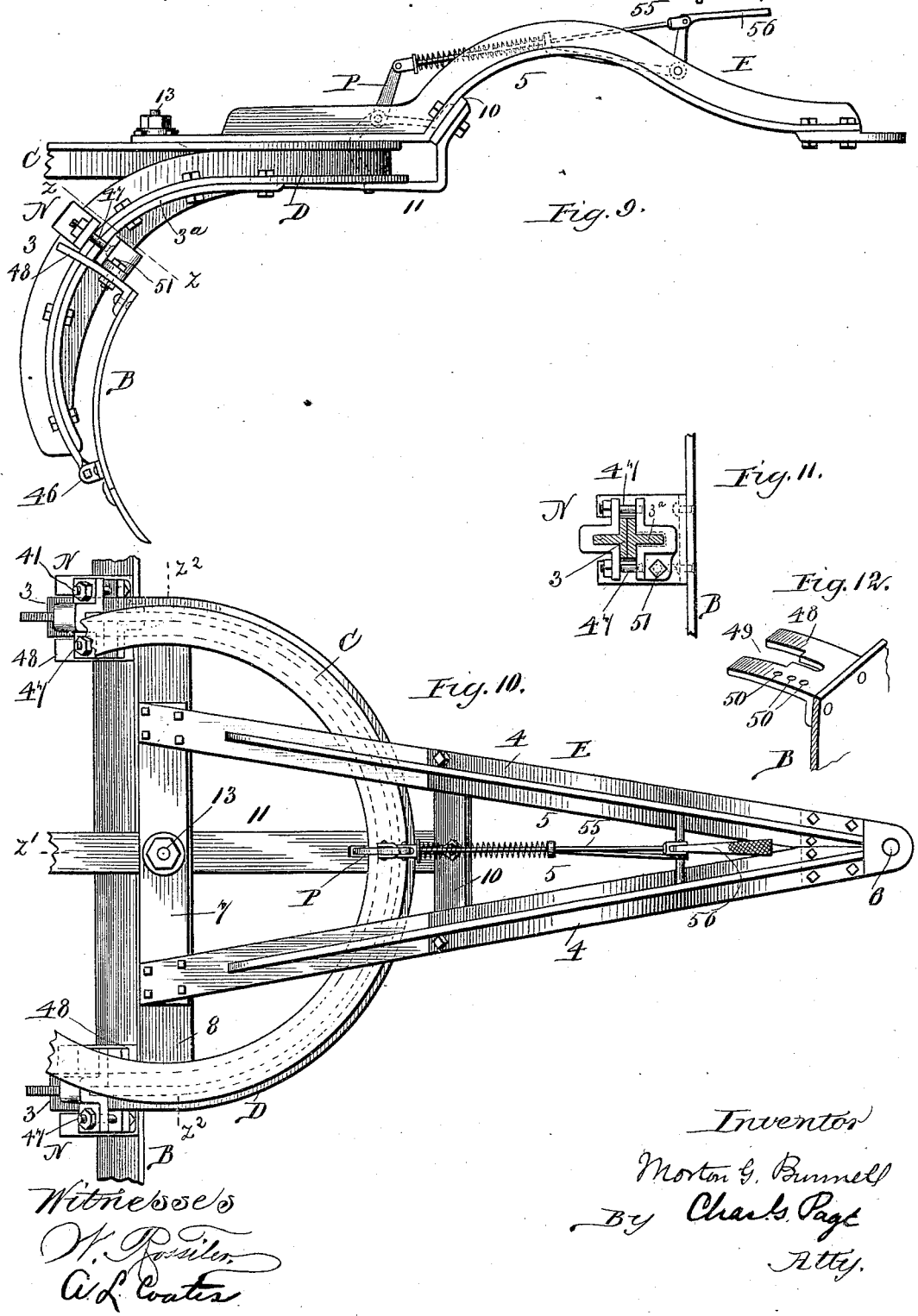

(No Model.) 9 Sheets—Sheet 6.
M. G. BUNNELL.
MACHINE FOR MAKING AND REPAIRING ROADS.
No. 427,740. Patented May 13, 1890.
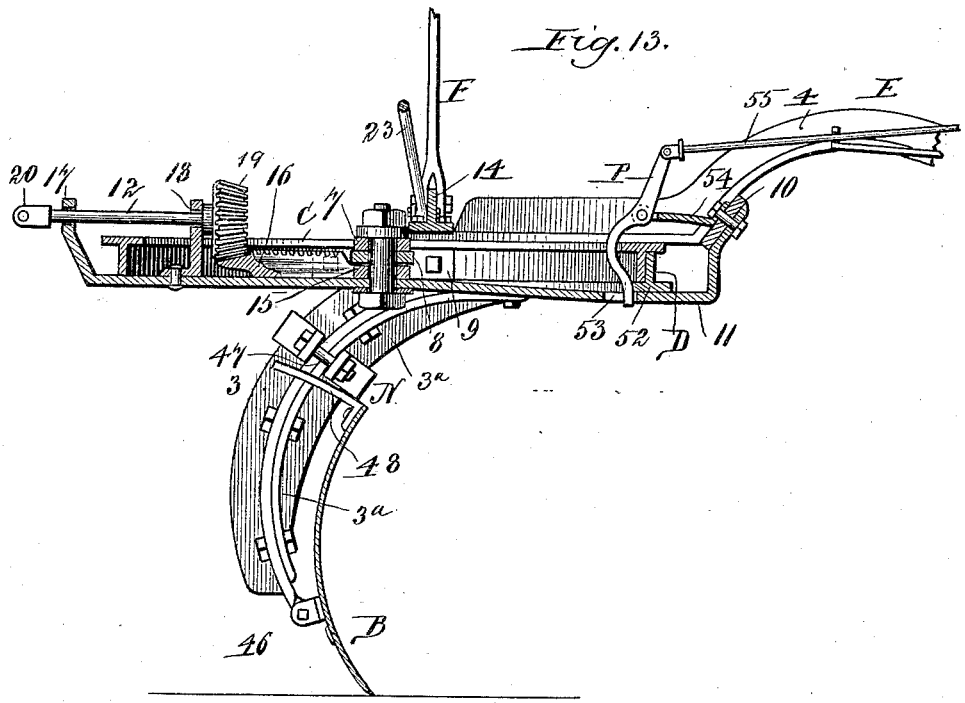
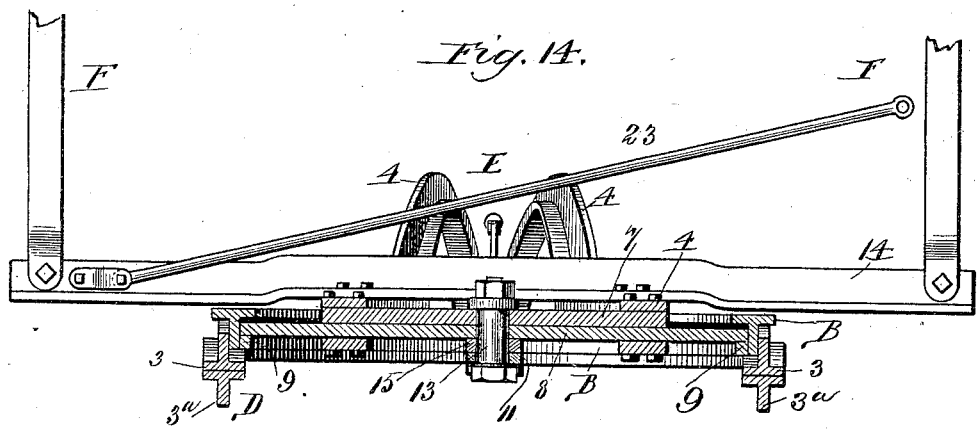

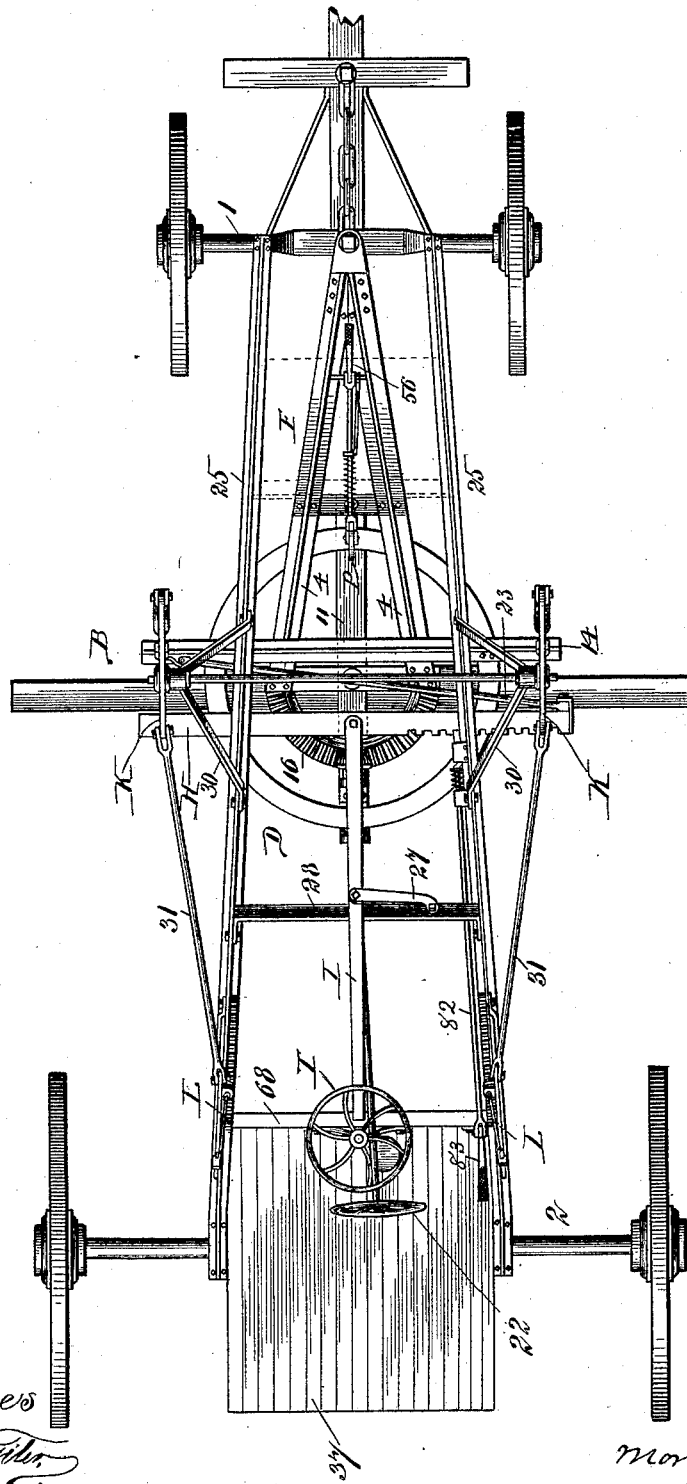

(No Model.) 9 Sheets—Sheet 8.
M. G. BUNNELL.
MACHINE FOR MAKING AND REPAIRING ROADS.
No. 427,740. Patented May 13, 1890.
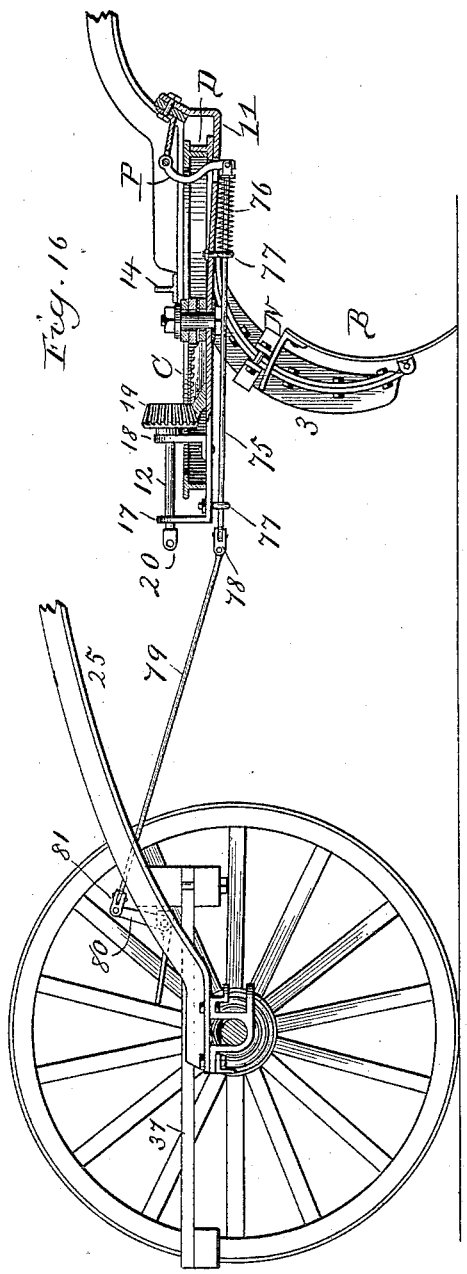
Witnesses
W. Rossiter
A. L. Coates
Inventor
Morton G. Bunnell
By Chas. G. Page
Atty.

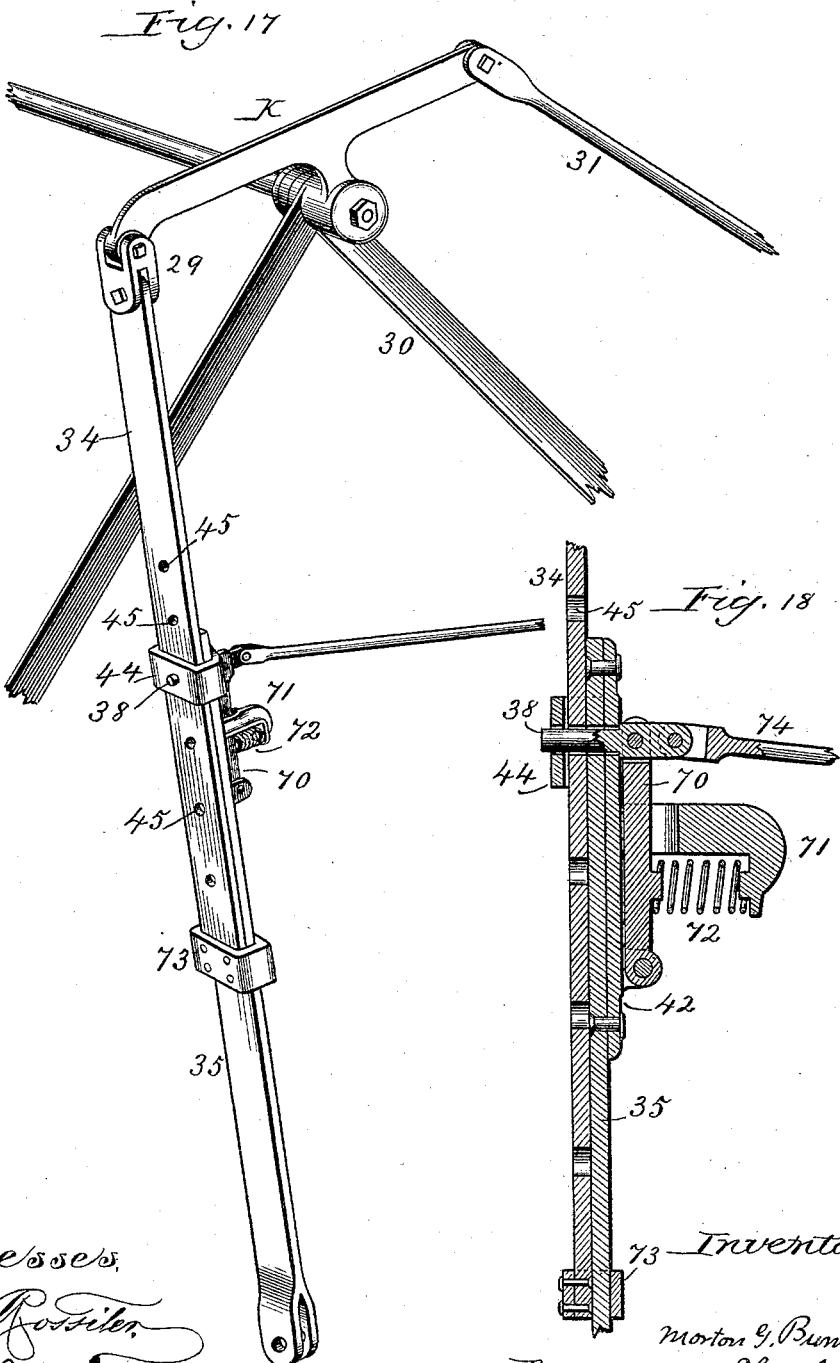

UNITED STATES PATENT OFFICE.

MORTON G. BUNNELL, OF CHICAGO, ILLINOIS, ASSIGNOR TO FREDERICK C. AUSTIN, OF SAME PLACE.

MACHINE FOR MAKING AND REPAIRING ROADS.

SPECIFICATION forming part of Letters Patent No. 427,740, dated May 13, 1890.

Application filed December 30, 1889. Serial No. 335,400. (No model.)

*To all whom it may concern:*

Be it known that I, MORTON G. BUNNELL, a citizen of the United States, residing at Chicago, in the county of Cook and State of Illinois, have invented a certain new and useful Improvement in Machines for Making and Repairing Roads, of which the following is a specification.

My invention relates to road-making and road-repairing machines of that class in which the plowing and scraping are effected by a comparatively long blade carried by a wheeled vehicle.

While my invention is particularly applicable to reversible road-machines—that is to say, to machines in which the blade can be swung horizontally about a point midway of its length, so as to either place the blade more or less oblique to the line of progression or place either of its ends ahead—it is also applicable to non-reversible machines, in which said feature of horizontal swing or adjustment on the part of the blade is not present.

The object of my invention is to provide improved means for adjusting the body-frame along the rear axle for purposes well understood in the art; to permit an attendant standing on the rear platform to control the depth to which the blade can be forced into the ground by its allotted raising and lowering device; to provide an improved draft-bar and means of connecting the same with the circle; to provide improved means for holding the blade, and to provide certain novel and improved details serving to render the construction of a steel machine a practical and desirable matter.

To the attainment of the foregoing and other useful ends my invention consists in matters hereinafter set forth, and particularly pointed out in the claims.

Figure 2:
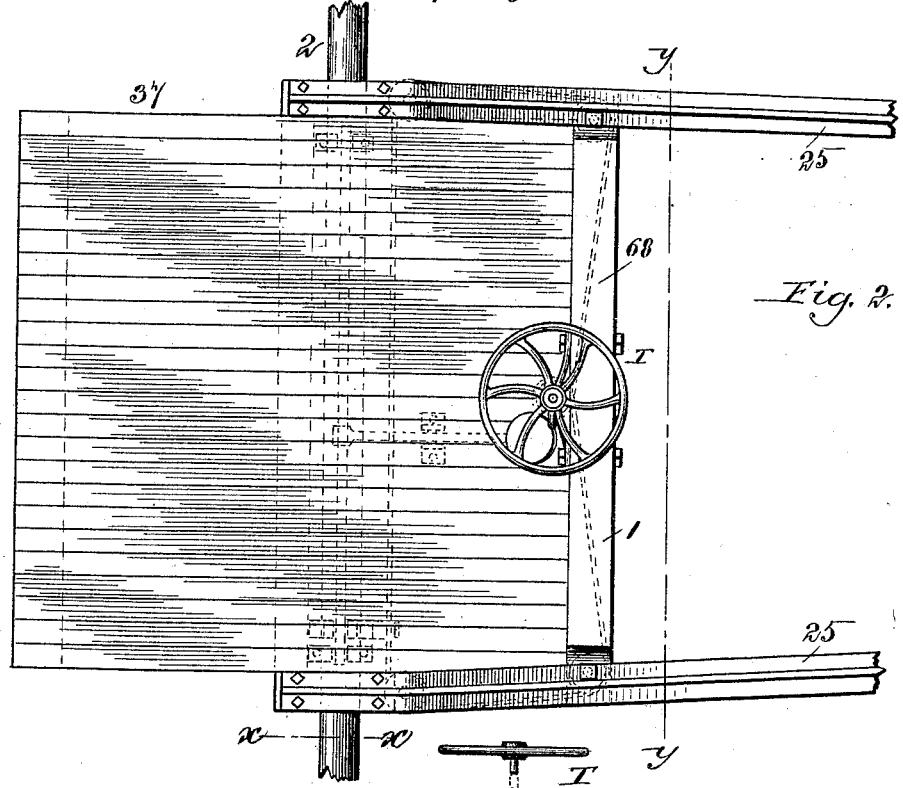
Figure 4:
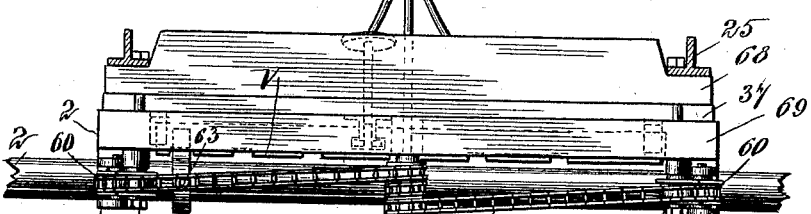

In the accompanying drawings, Figure 1 represents in perspective a machine embodying my invention. Fig. 2 is a top plan view of the rear portion of the machine with the long rear axle broken away at its ends, so as to omit the rear wheels. Fig. 3 is a side elevation of the matters shown in Fig. 2, the axle being in section on line $x\ x$. Fig. 4 is a sectional elevation of Fig. 2, the section being on line $y\ y$. Fig. 5 is a view similar to Fig. 2, with the rear platform and side bars of the body-frame indicated in dotted lines and with a sprocket on the hand-wheel shaft in place of the worm-drum which is shown in Figs. 3 and 4. In said Fig. 5 the hand-wheel shaft is shown in cross-section, the section being made on a plane below the hand-wheel. Fig. 6 is a view similar to Fig. 4, but represents the said sprocket of Fig. 5. In Figs. 3, 4, and 6 the hand-wheel shaft is, for convenience of illustration, broken away just below the hand-wheel. Fig. 7 represents in perspective one of the adjustable hangers suspended from one of the T-levers. Fig. 8 shows on a somewhat larger scale a central longitudinal section through a portion of the hanger and latch. Fig. 9 represents in side elevation the double-goose-neck draft-bar, a portion of the circle, and the segment secured to the circle and carrying the blade. Fig. 10 is a top plan of the matters shown in Fig. 9. Fig. 11 is a section, taken on line $z\ z$ in Fig. 9, through one of the arms of the segment, and shows in plan one of the adjustable clips by which the blade is attached to the segment-arms. In said view a portion only of the top edge of the blade is represented. Fig. 12 shows in perspective a portion of the blade and one of the brackets secured thereto. Fig. 13 is a section taken through Fig. 10 on line $z'$, the forward portion of the double-goose-neck draft-bar being broken away, while, on the other hand, the circle is completed, so as to show the way in which the cog for turning the circle is supported. Fig. 14 is a section taken through Fig. 10 on line $z^3\ z^2$, looking toward the forward end of the machine, the cross-bar 14, to which the hangers are attached, being added to said view and shown in elevation. Fig. 15 is a top plan view of the machine. Fig. 16 represents certain portions of the machine, part in side elevation and part in vertical longitudinal section, and is made to illustrate means by which an attendant standing on the rear platform 37 can control the latch P in place of rendering said latch subject to the control of the driver, as illustrated in certain preceding figures. Figs. 17 and 18 are views, respectively, corresponding with Figs. 7 and 8, but illustrating a preferred construction of latch for locking the adjustable or extensible hanger.

In said drawings, A indicates the body-frame, which is pivotally supported upon the front axle 1, but so supported upon the rear axle 2 that it can be shifted along the same. B indicates the scraper-blade, which is attached to the turn-table or circle C through the medium of the segment D. Said segment is secured to the circle and provided with downwardly-bent arms 3, which are connected with the blade. The circle is pivotally attached to the draft-bar E, so that the blade can be swung horizontally, as may be desired. The draft-bar has its forward end pivotally held at the front end of the machine, so that the blade, which is pivotally connected with the draft-bar, can be swung toward either side of the machine, as may be desired.

The "draft-bar," as I term it, consists of a double-goose-neck bar, which practically involves a couple of bars 4, each bent upwardly, as at 5, to form an arch or goose-neck which rises from the circle. The two bars 4 of this double goose-neck draft-bar meet and are rigidly united to one another at their forward ends, as best shown in Fig. 10, so that they can as a whole be pivotally held by a single pivot passing through the hole 6. Said bars 4 diverge rearwardly, and are at their rear ends firmly secured to a plate or bar 7, which is pivotally connected with the circle. The plate or bar 7 rests upon the horizontal stay-bar 8 of the circle, which said stay-bar is arranged diametrically across the space within the circle and at its ends suitably secured to the circle either by bolts or by setting within recesses formed either in castings on the circle or in plates 9, Figs. 13 and 14, secured thereto. At a point forward of the circle the two bars 4 of the double-goose-neck draft-bar are connected together and braced by a bar 10, Figs. 10 and 13, and to said brace-bar 10 is secured the forward end of a longitudinally-arranged bar 11. The ends of the bar 11 are bent upwardly, so that while it may extend under the circle, as best shown in Fig. 13, its forward end can be secured to bar 10, so as to firmly connect it with the double-goose-neck draft-bar, while its rear end may rise to a height to permit it to provide a bearing for a shaft 12, from which the circle is operated. By the foregoing arrangement the circle can turn independently of the draft-bar, which is divided so as to connect with the plate or bar 7 at opposite sides of the pivot 13, which said pivot, it will be observed, extends through the bars 7, 8, and 11. This spreading apart of the bars or members 4 of the double-goose-neck draft-bar not only provides a draft-bar capable of withstanding the lateral and torsional strains to which it is subjected, particularly in plowing the soil to form new roads, but also more effectively steadies the connection between the circle, the draft-bar, and the hangers F, which latter are at their lower ends pivotally attached to the horizontally-arranged cross-bar 14. The cross-bar 14 is secured upon the rear ends of the bars 4, and hence is practically secured upon the bar or bearing-plate 7, to which the circle is pivoted. The bar or bearing-plate 7, which is held rigid with the circle and connected with the longitudinally-arranged plate or bar 11 by the pivot 13, may rest directly upon the bar 11, or, as in Figs. 13 and 14, a washer 15 can be arranged between said two bars. While the bars or divisions 4 of the double goose-neck extend over the circle, the bar 11, which constitutes an extension of the draft-bar, extends under the circle, so that the portion of the latter which is forward of pivot 13 will lie and move between the bars 4 and 11.

The circle carries a ring-gear or part ring-gear 16, which is arranged within and rigid with the circle, and to such end is conveniently bolted to the stay-bar 8. The short rotary shaft-section 12 is supported by bearings at 17 and 18 upon the bar 11, and is provided with a cog 19, which engages the circle-gear 16, so that by turning said shaft the circle can be turned about the axis of pivot 13. The rotary shaft-section is at point 20 pivotally connected with or jointed to the hand-wheel shaft G, which extends through a bearing 21 on the main frame and carries a hand-wheel 22.

The cross-bar 14 is connected with the transversely-arranged notched slide-bar H by a rod or link 23, and said bar H is arranged to slide in bearings 24 on the sides 25 of the body-frame, the connection between rod 23 and bar H being at the point 26. The slide-bar H, for swinging the draft-bar toward either side of the machine, is operated by the hand-lever I, which is pivoted upon a swinging fulcrum 27, which is supported upon a cross-piece 28 in the body-frame.

The hangers F are connected by universal joints 29 with the T-levers K, which are in turn pivotally supported upon the standards 30. The T-levers are connected by rods 31 with the hand-levers L, which are provided with latches 32 for locking in rack-segments 33.

Each hanger F comprises a couple of sections 34 and 35, the sections 34 being connected by the universal joints 29 with the T-levers, while the sections 35 are pivotally connected with the cross-bar 14. The hanger-sections 35 slide upon the hanger-sections 34, so as to permit each hanger to be adjusted in length, and as a means for locking said sections together I provide latches, as at M—one for each hanger. These latches can be operated by rods or cords 36, which are carried back so as to be available to an attendant standing upon the rear platform 37.

While various forms and constructions of latches can be employed in connection with the hangers, I have shown in Figs. 7 and 8 a latch consisting of a pin 38, which is pivoted to a lever 39. The latch-lever 39 is pivoted at 40 to a bearing 41, which is rigid with the hanger-section 35. Said bearing 41 is conveniently formed with or secured to a plate 42, which is bolted to the hanger-section 35 and provided with loops or straps 43 and 44, which embrace the hanger-section 34, so that while keeping the two hanger-sections together the lower hanger-section 35 may slide along the upper hanger-section 34.

The hanger-section 34 is provided with a line of recesses 45, in which the latch proper 38 may engage, and the loop 44 is preferably provided with a recess in which the latch can engage when it is in position to lock the two parts of the hanger together. The lower hanger-section is also provided with a hole through which the latch can pass, so that the parts can be held firmly together. As a matter of course the latch could be arranged upon the upper hanger-section, and in such case the lower hanger-section would be provided with the holes or recesses 45. By operating the latch so as to unlock the lower hanger-section the latter will be drawn down by the weight of the blade should the latter be at such time sufficiently elevated, and this elevation of the blade can be attained by swinging back the hand-levers L. In such case the extent to which the blade can drop will determine the extent to which the hanger or hangers can be adjusted in length, it being obvious that since one end of the blade can be raised and lowered independently of the other the hand-levers can be set so that either or both hangers can be lengthened. The shortening up of the hangers can be effected by a reverse operation. Thus if it is desired to shorten up both hangers the attendant, standing on the rear platform, can operate the latches so as to unlock the lower hanger-sections from the upper hanger-sections and then throw forward the hand-levers L, which said operation will, through the medium of the rods 31 and levers K, (whether the latter be T-levers or ordinary bell-cranks,) force down the upper hanger-sections 34. Assuming the blade to be resting upon the ground, said downward movement of the upper hanger-sections will of course cause them to slide downwardly upon the lower hanger-sections, in which way the hangers can be shortened up, and their sections then locked together by the latches. In a similar way one hanger can be shortened independently of the other hanger, and hence one end of the blade can be readily hung lower than the opposite end thereof. The segment D is formed by an angle or T iron bar, which is bent so as to form a segmental or semicircular portion, which embraces a portion of the circle C, and downwardly-extending curved arms 3, which are arranged back of the blade. These arms 3 are re-enforced by bent angle or T irons 3ª, which are fitted to the arms 3 so as to form arms which are T-shaped in cross-section, and which serve to withstand the great strain to which they are subjected. It will be seen that the union of the horizontal portion of the segment with the angle or T iron circle provides in effect a T-iron, while the union of the re-enforcing pieces 3ª with the arms 3 of the segment attains a like result from the points where said arms leave the circle.

As a means for varying the pitch of the blade, it is hinged at a suitable distance above its lower edge to the lower ends of the segment-arms, as at 46, Fig. 9, wherein one of said arms is shown, and at or near its upper edge adjustably connected with said segment-arms. As a means for thus adjustably connecting the blade with the segment-arms, I provide each arm with a two-part clip N, (best shown in Fig. 11,) which is arranged upon the arm and its two parts bolted together thereon by bolts 47. These clips are adjustably secured upon brackets 48, which are in turn rigidly secured upon the back of the blade, as best illustrated by the bracket shown in Fig. 12. Each bracket 48 is provided with a notch 49, shaped to receive one of the re-enforced arms of the segment, so as to provide a steady connection between the blade and the segment, and at the same time permit the blade to turn upon the pivots or hinges at 46.

As a simple mode of adjustably securing the clips to the brackets, each bracket is provided with a line of bolt-holes 50 for a bolt 51, which can engage the clip and extend through any one of the holes in a bracket.

The circle can be locked against turning by a latch P. The inner edge of the lower flange of the upper portion 52 of the segment, Fig. 13, is notched, so that the latch may engage therewith, and the bar 11 is provided with an opening 53, through which the lower end of the latch may extend. The latch is pivoted on a bracket 54, Fig. 13, which is secured to the cross-bar 10 of the double-goose-neck draft-bar. In several of the figures the latch-operating rod 55 is extended forward to and connected with foot-lever 56, which can be operated by the foot of the driver.

The body-frame is supported upon the rear axle through the medium of small rolls R, which are journaled in boxes S and arranged to lie upon the axle, so that they may travel along the same, and thereby permit the body-frame to be shifted toward either rear wheel with great ease. The side bars 25 of the body-frame are supported upon and arranged to the boxes S, through which latter the long rear axle 2 extends. The hand-wheel T is arranged within convenient reach of an attendant standing upon the rear platform 37, and is secured upon the rotary shaft 57, for which latter suitable bearings are provided upon the body-frame of the machine. The hand-wheel shaft 57 is preferably provided at its lower end with a sprocket-wheel 58, as in Figs. 5 and 6, for a link belt U, although in place of the sprocket it could be provided with a spirally-grooved drum or worm 59, as shown in full lines in Figs. 3 and 4, and indicated in dotted lines in Fig. 2. The chain or link belt passes about pulleys 60, which are journaled in the boxes S, while in Figs. 2, 3, and 4 said link belt also passes about pulleys 61, which are arranged in front of the pulleys 60 and journaled in a suitable portion of the body-frame. The chain or link belt V is also suitably connected with the rear axle—as, for example, a collar 62 is made rigid with the axle and provided with a bolt or arm 63, which engages the link belt, so that while connecting the chain or belt with the axle it also keeps the axle from turning. By such arrangement the rotation of the hand-wheel shaft either way will operate the chain gearing comprising the chain and two or more pulleys, so as to shift the body-frame along the rear axle. I also effect such shift in a much quicker and easier way than can be attained by the use of a rack and pinion, as in United States Letters Patent No. 146,810, wherein a rack and pinion are employed for shifting the body-frame along an extended rear axle.

As a means for locking the body-frame after it has been suitably adjusted, I provide a latch V, consisting of a notched bar arranged to rise and fall in guides 64, which can be secured to the under side of the rear platform 37. The latch V can be operated by a foot-lever 65, which is pivoted to a bearing 66, arranged on the under side of the platform 37. The foot-lever extends up through an opening in said platform, so as to be readily accessible to the foot of the attendant.

The collar or other fixture on the axle, as at 62, is adapted for engaging in any one of the notches of the latch-bar V, and hence the axle is practically provided with a tooth or suitable fixture, which can be engaged by the latch. The attendant can with his foot operate the foot-lever so as to free the latch from engagement with the rear axle and then shift the body-frame by turning the hand-wheel T.

With regard to certain details of construction, each box S can be made in one piece and formed with an opening for the axle 2 and a roll R, and with another opening or space between its forwardly-projecting lugs or lips 67, so as to receive a sprocket or pulley 60, which can be journaled in said lips. The forward end portion of the platform 37 is bolted between two cross-bars 68 and 69, (see Figs. 3 and 4,) and the side bars 25 of the body-frame are secured to the cross-bar 68. One of the bearings for the hand-wheel shaft 57 can be secured to the cross-bar 68, while another bearing for said shaft can be secured to the cross-bar 69. Bearings for the pulleys 61 can also be conveniently applied to the cross-bar 69.

Figs. 17 and 18 illustrate a preferred construction of latch for locking the longitudinally-adjustable or extensible hanger in its adjustment. In said figures the latch is pivotally attached to a spring-controlled lever 70, which is pivoted upon the plate 42. The plate 42 is rigid with the hanger-section 35, and is provided with a guard or keeper 71 for steadying the lever 70 and holding a spring 72 in engagement therewith. The plate 42, or practically the hanger-section 35, is provided with a perforated strap or loop 44, which corresponds with the loop 44 in Figs. 7 and 8. The hanger-section 34 is provided with a strap or loop 73, which embraces the hanger-section 35. By the foregoing arrangement of loops or keepers 44 and 73 the two sections of a hanger cannot become accidentally separated. The latch 38 is operated by a rod 74, which extends back to the rear platform and consists of a crank-arm 75 on a treadle 76.

While I have in certain figures illustrated a connection between latch P and a foot-lever arranged within reach of the driver, I have in Fig. 16 shown an improved arrangement by which the latch can be operated by the foot of an attendant standing on the rear platform 37. To such end I connect with the lower end of latch P a slide-rod 75, which is subject to the action of a spring 76 and supported in guides 77, carried by the rear extension 11 of the draft-bar. The rod 75 is connected by a universal joint at 78 with a rod 79, which latter extends back to and is connected with a bell-crank treadle 80. Said treadle 80 is pivotally supported upon the rear platform, and is connected with the rod 79 by a hinge or universal joint, as at 81. By such arrangement the lever 80 is connected with the latch by a universally-jointed rod comprising the rods or rod-sections 75 and 79, so that said connection can adapt itself to the various movements of the draft-bar.

What I claim as my invention is—

1. In a road-making and road-repairing machine, the combination, substantially as hereinbefore set forth, with an extensible two-part hanger for raising and lowering the blade, of a latch for locking the parts of the hanger in their relative adjustment.

2. The combination, with the blade of an extensible two-part hanger, for the purpose set forth, of a latch for locking the hanger, and means, under the control of an attendant standing on the rear of the machine, for controlling the latch.

3. The combination, with a hanger, for the purpose set forth, comprising the sections 34 and 35, of a latching device comprising a latch 38, a lever arranged at the rear of the machine, and a rod 74, connecting said lever with the latch.

4. The combination, with the extensible sectional hanger, of the latch 38 and a spring-controlled lever supported upon the hanger and carrying said latch.

5. The combination, with a hanger, for the purpose set forth, comprising sections 34 and 35, respectively provided with loops or keepers 44 and 73, of a latch carried by one of said hanger-sections.

6. The combination of the circle, carrying the blade and provided with a stay-bar 8, and the double-goose-neck draft-bar E, extending over the forward portion of the circle and secured to a bar 7, which is pivoted to the stay-bar 8.

7. The combination of the circle carrying the blade, the double-goose-neck draft-bar E, extending over the circle and pivotally connected therewith, and the draft-bar extension 11, extending under the circle, for the purpose described.

8. The segment having downwardly-extending arms which back the scraper-blade, and which are re-enforced by the angle-irons $3^a$, substantially as described.

9. The angle-iron segment secured to the angle-iron circle and having downwardly-extending arms 3, which are re-enforced by the angle-irons $3^a$, substantially as described.

10. The blade hinged to the downwardly-extending segment-arms and provided with brackets which are adjustably connected with clips on the segment-arms, substantially as set forth.

11. The combination, substantially as hereinbefore set forth, with the rear axle and body-frame adjustable thereon, of the chain connected with the rear axle and passing about two or more pulleys carried by the body-frame, and means for operating said chain.

12. The combination, substantially as hereinbefore set forth, with the rear axle and the body-frame adjustable thereon, of the chain connected with the rear axle, pulleys 60, about which the chain passes, and a shaft 57, provided with a winding-sprocket 58 for operating the chain.

13. The combination, with the rear axle and body-frame adjustable thereon, of a chain gearing for shifting the body-frame along the rear axle, and boxes S, for the purpose described.

14. The combination, with the long rear axle, of the body-frame supported thereon by intervening rollers, substantially as and for the purpose set forth.

15. The combination, with the rear axle and the body-frame, of boxes receiving the rear axle and carrying rollers which intervene between the body-frame and rear axle and support the body-frame.

16. The combination, with the rear axle and the body-frame adjustable thereon, of rollers supporting the body-frame upon the rear axle, and chain gearing for shifting the body-frame along the rear axle.

17. The combination, with the blade and a rotary support therefor, of a latch for locking said support, and a universally-jointed shaft connected with a lever at the rear of the machine, substantially as set forth.

MORTON G. BUNNELL.

Witnesses:
CHAS. G. PAGE,
ANNIE L. COATES.